Nov. 26, 1968  R. STARMER  3,412,558
DISTILLATION AND POWER PRODUCING PLANT
Filed March 18, 1965
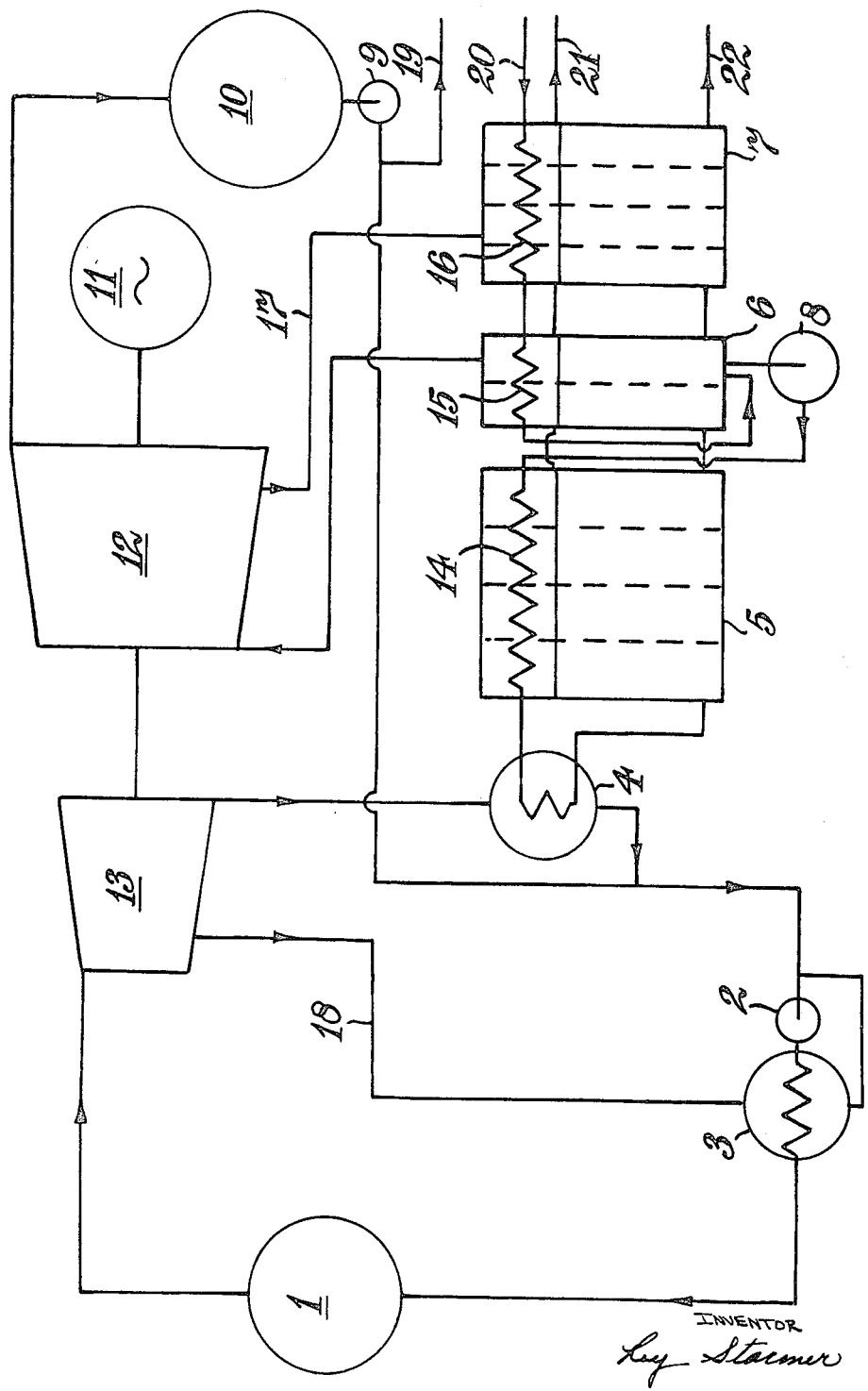
INVENTOR
Roy Starmer
BY
Watson, Cole, Grindle & Watson
ATTORNEYS United States Patent Office 3,412,558
Patented Nov. 26, 1968

3,412,558
DISTILLATION AND POWER PRODUCING PLANT
Roy Starmer, Peterlee, England, assignor to Applied Research and Engineering Limited, Peterlee, England, a British company
Filed Mar. 18, 1965, Ser. No. 440,861
Claims priority, application Great Britain, Mar. 4, 1965, 9,358/65
5 Claims. (Cl. 60—67)

ABSTRACT OF THE DISCLOSURE

A combination distillation and power plant is described in which the vapor extracted from the distillation plant is expanded in two different stages in the power plant, heat extracted from the gaseous substance after the first stage expansion being utilized to heat the liquid and produce the necessary hot gases and vapors under pressure. Heat rejected by the distillation unit is converted into power by expansion of the gaseous material in the second stage of the power plant.

---

The invention relates to a combination of a distillation plant and a plant for the production of power by expansion of vapour (e.g. steam) or gases. The distillation plant, which may operate by flash evaporation, may, for example, be used for purification of brine (e.g. sea water) by evaporation and condensation.

All forms of distillation plant need a source of heat at say temperature $T_1$ for heating and a sink at, say, temperature $T_2$ for the condensation. Many forms of evaporators are used, but with all types either the capital cost or the amount of heat required to distil a given quantity of liquid can be reduced as the range of temperature, i.e. $(T_1-T_2)$ is increased.

In a flash evaporator, for example, the condensing tube surface per pound of distillate made is given by:
$A = L/U \Delta T.$ Where L is the latent heat of steam
U is the heat transfer coefficient and
$\Delta T$ is the temperature difference available for effecting condensation.

$\Delta T$ is dependent on the plant and design, i.e. number of stages, terminal temperature difference and concentration of the liquid. Plants with the same value of $\Delta T$ can be considered comparable and for these, the amount of heat required ($h$) to produce a given amount of distillate is inversely proportional to the temperature range $(T_1-T_2)$, i.e.

$$H \alpha \frac{1}{(T_1-T_2)}$$

In order to economise on the amount of heat required, it has therefore been the practice to increase the temperature range as much as possible. In the case of sea water distillation plants, $T_2$ is usually dictated by the sea water temperature whilst $T_1$ is usually the highest value which can be used without fouling by scaling of the heat transfer surfaces, either with or without chemical treatment. This temperature is often taken as 190° C. if a polyphosphate treatment is used whilst 250° F. is often taken if the sea water is acid dosed to reduce the carbonate scale formation.

Since these temperatures are low by modern power station practice, it is often found economic to supply the evaporator with waste heat from a power cycle. It has been the practice, for example, to supply steam to a turbine, expand it to a suitable pressure and then pass the steam as the heating medium to an evaporator. In cases where more power is required than the evaporator system warrants, part of the steam is passed out of the turbine at a convenient point to the evaporator whilst the rest is further expanded through the turbine in the normal manner. In either case heat or steam is used for distillation purposes which would otherwise have produced useful power. This lost power often represents lost revenue and must therefore be kept to a minimum.

In some conventional distillation systems, fresh water is progressively made fairly uniformly over the temperature range $(T_1-T_2)$. Unfortunately the constructional features of an evaporator are not uniform over this range. The specific volume of steam for example is 13.8 cu. ft./lb. at 250° F., 33.6 at 200° F., 97.2 at 150° F., 350.6 at 100° F., and even 634 cu. ft./lb. at 80° F. From these figures it can be seen that it would be more economic in plant cost to design the vapour flow passages in the evaporator for use at a high rather than a low temperature. Similarly the value of the overall condensing heat transfer coefficient is increased by approximately 30% at 250° F. as compared to that at 100° F. These and many other factors make it desirable to obtain more than average water (or other distillate) production at the high end of the temperature range.

It is an object of the present invention to achieve this desirable effect while making use of the heat at the lower end of the temperature range which is rejected by the distillation plant.

In one of its forms the invention provides the combination of a distillation plant with a plant for production of power in which vapour is extracted from the distillation plant and expanded in the power-producing plant to produce power.

The arrangement may be that after expansion as aforesaid the vapour is condensed (e.g. in a separate condenser or in the distillation plant) to produce further distillate.

Preferably the distillation plant operates progressively over a particular temperature range and the vapour is extracted at the lower end of the temperature range or at an intermediate point or points in the range.

The invention further provides the combination of a plant producing power by expansion of steam or other vapours with a distillation plant in which heat for effecting evaporation is extracted from the power plant at a position intermediate in the power-producing expansion and heat rejected by the distillation plant is used to produce further power, e.g. is returned to the power plant at a position later in the expansion.

In one form of the invention the heat is extracted by bleeding hot gases or vapour (e.g. steam) from the power plant, the gas or vapour is used, by heat exchange, to heat liquid to be evaporated and vapour produced from the liquid is returned to the power plant.

The power plant may be an internal-combustion engine (or series of internal-combustion engines), for example, a turbine (or a series of turbines) operated by expansion of steam or gases at high temperature, steam or gases may be exhausted from the engine or bled from the engine at a position intermediate in the expansion, used by heat exchange to evaporate liquid to be distilled and some of the vapour produced may be fed to the engine or to another engine, to produce power.

In the case in which steam is bled from the engine, the steam may be superheated, dry, saturated or wet.

The principles on which the invention is based may be further explained as follows:

In the cycle, heat (H) to the evaporator is taken in at temperature $T_1$ and given out at $T_a$ and, as indicated previously, for comparable evaporators, each producing the same amount of water $$H \alpha \frac{1}{(T_1-T_a)} \text{ or } H(T_1-T_a) = \text{const}$$

It will therefore be seen that if the temperature range were to be reduced by half the heat taken out of the power cycle would have to be doubled, but there is no reason why this heat cannot be put back into the cycle, assuming temperature $T_a$ is sufficiently high above the sink temperature $T_2$.

If an amount of heat H is taken out of the power cycle at temperature $T_1$ and replaced, after being used in an evaporator, at a temperature $T_a$ for further expansion to a sink temperature $T_2$, this sequence of events can be considered as two separate cycles, one operating between $T_1$ and $T_a$ the other operating between $T_a$ and $T_2$.

On this basis the power lost by taking heat H out of an ideal cycle operating between $T_1$ and $T_2$ would be $$P_L = H \frac{(T_1-T_2)}{T_1}$$

the power gained by returning heat H to an ideal cycle ideal cycle operating between $T_1$ and $T_2$ would be $$P_g = H \frac{(T_a-T_2)}{T_a}$$

and hence the net loss of power resulting from the insertion of a power cycle is $$P_{NL} = H \frac{(T_1-T_2)}{T_1} - \frac{(T_a-T_2)}{T_a} = \frac{H(T_1-T_a)T_2}{T_1 T_a}$$

Since for comparable evaporators each producing the same amount of water it has been shown that $$H(T_1-T_a) = \text{const}$$

the net power loss $$\alpha \frac{T_2}{T_1 T_a}$$

for a given distillate output in comparable evaporators.

It will be thus seen that this loss is a minimum when both $T_1$ and $T_a$ have the greatest possible value. It is already the practice to supply heat to the evaporator at the highest temperature, but the analysis to illustrate the invention indicates it is also desirable to return the heat to the power cycle as soon as practicable, which is contrary to accepted current practice. Since however the evaporator will require a heated feed and a blow down to keep the salt concentration acceptable, the feed heater or blow down cooler can act as an auxiliary evaporator down to the full sink temperature $T_2$.

In the case, as just described, in which the evaporator operates between temperature $T_1$ and $T_2$ it is preferable that the distillate made in the top half of the range is greater than 60% of the total.

It should also be noted that the savings in construction cost of an evaporator can be large by operating the major proportion at the high temperatures as indicated. It is therefore possible and beneficial, even in the case of a non-power producing distillation plant, to generate power by extracting steam in the manner described and using the power to compress further steam up to higher pressures.

One further advantage of the cycle is that it avoids the use of a steam moisture separator in a combined power distillation plant where partial expansion of the steam (e.g. through a steam turbine) would normally result in unacceptably wet steam. This is particularly important in the case of plants using some nuclear reactors as the heat source. In such an instance steam can be removed from the turbine, dried and returned. An evaporator can receive its heat in the form of wet steam and return it, at a lower pressure, dry and saturated. This drying in fact results in a gain in practical turbine efficiency. Reducing the steam wetness of a turbine therefore, not only reduces erosion wear but also increases the power available from a given steam flow. Thus wet steam may be fed to the evaporator and the drier steam returned to the turbine at a lower pressure.

By way of example, a combined power-producing and flash evaporation distillation plant and its operation in accordance wtih the invention will now be described with reference to the accompanying diagrammatic drawing of the plant.

The power-producing plant basically comprises a boiler 1, high and low pressure turbines 13, 12 respectively providing power to drive an alternator 11, a boiler-feed pump 2, a boiler-feed heater 3 and a flash evaporator having, in this example, three groups of chambers hereinafter termed chambers 5, 6 and 7, a plurality of heat exchangers 4, 14, 15 and 16 and a pump 8. The broken lines in the chambers 5, 6 and 7 indicate that in known manner each chamber is divided into a number of compartments.

The low pressure turbine 12 (which may be the low pressure end of turbine 13) is supplied with steam from the high pressure turbine and also with vapour from chamber 6. The turbine has steam outlet connections to chamber 7 via 17 and to a condenser 10. There is a pump 8 for the condensate with alternative connections 19 to storage and to the heater 3 and thence to the boiler.

The function of all these members will be ascertained from the following description of the operation of the plant.

Steam from the boiler 1 is fed to the high pressure turbine 13 which in turn provides power to drive the alternator 11. The exhaust, or at least part of the exhaust, of the turbine 13 is passed to the heater 4, which heater is used as one of the means of supplying heat to the evaporator at a temperature of, say, $T_1$. The condensate from the heater 4 is then returned to the boiler, the condensate being first preheated in the heater 3 by steam 18 bled from the high pressure turbine 13. The return of the condensate to the boiler is effected, or at least assisted, by the feed pump 2.

The liquid to be distilled, which in this example is brine, is fed in at 20 to the evaporator and is pre-heated in the heat exchangers 15 and 16, which heat exchangers derive their heat from the condensation of vapour from the flash chambers 6 and 7 and from cooling of the distillate produced by the said condensation. Further heat is also supplied, at least at the heat exchanger 16, by tapping some steam at appropriate temperature from the low-pressure turbine 12.

In operation of the evaporator, the brine is circulated by the pump 8 from chamber 6, through the heat exchanger 14 through the heater 4, and then through chamber 5 back to chamber 6. The brine enters chamber 5 at approximately temperature $T_1$ and is capable of producing vapour by flashing in the chambers 5 and 6 and, as blowdown in chamber 7. The vapour so produced condenses in the heat exchangers 14, 15 and 16, to form the distillate which is collected and discharged at 21, at the lower temperature end of the evaporator, i.e. at a temperature $T_2$.

In addition to the above, part of the vapour produced in the chamber 6, which is at a temperature intermediate in the temperature range of the evaporator, say $T_a$, is removed from the chamber 6 before it is condensed and, after being scrubbed by passage through the condensing tube bank or a water washing plant, is passed to the inlet of the low-pressure turbine 12, which provides auxiliary power to the alternator 11. This vapour, together with steam passed from 13 direct to 12 is then condensed in the condenser 10. The pump 9 then discharges the condensate of the condenser 10 through a pipe 19 or alternatively, returns to the boiler as feed therefor.

In this specification, it has been shown that it is advantageous to supply heat to the evaporator at the highest possible temperature, in this case $T_1$ and also to return this heat by means of vapour, to the power cycle as soon as practicable, which in this example is $T_a$, although the temperature range of the evaporator is still $T_1$ to $T_2$ ($T_2$ being the sink temperature of the evaporator). This specific example has shown one form of apparatus in which this can be achieved. However, the apparatus may readily be constructed in different ways and the invention is not limited to the particular arrangement shown and described.

I claim:
1. Apparatus for producing power and distilled liquid comprising:
   (a) a two stage power plant operable to produce power by expansion in two stages of a substance in the gaseous state taken from the group consisting of hot gases and vapours,
   (b) heating means operable to produce hot gases and vapours under pressure,
   (c) means for feeding said gaseous substance into the first stage of the power plant for expansion therein,
   (d) a distillation unit comprising at least one flash evaporator with means for feeding thereto liquid to be evaporated, means for condensing vapour from the liquid and means for delivering the condensate outside the apparatus,
   (e) means operable to extract heat from the gaseous substance after expansion thereof in the first stage aforesaid and to transfer this heat to the liquid to be evaporated, and
   (f) means operable to convert heat rejected from the distillation unit into power by expansion of the gaseous substance in the second stage of the power plant.

2. Apparatus as claimed in claim 1 in which there is in the distillation unit means to compress the vapour which means has a driving connection to the power plant.

3. Apparatus as claimed in claim 1 in which the means to extract heat from the gaseous substance and to transfer this heat to the liquid to be evaporated comprises an indirect heat exchanger.

4. Apparatus as claimed in claim 1 in which the means for condensing the vapours in the distillation unit comprises means to effect heat exchange between the liquid to be distilled and the vapours.

5. Apparatus as claimed in claim 1 in which there is means to direct the exhaust from the second stage of the power plant back to the distillation unit to be condensed.

References Cited

UNITED STATES PATENTS

| | | | |
|---|---|---|---|
| 1,044,693 | 11/1912 | Schmidt | 60—49 |
| 1,398,946 | 11/1921 | Schmidt | 60—31 |
| 1,632,575 | 6/1927 | Abendroth | 60—73X |
| 1,674,049 | 6/1928 | Losel | 60—73 |
| 1,993,585 | 3/1935 | Baumann et al. | 60—49X |
| 2,370,949 | 3/1945 | Gaisberger | 60—49X |
| 2,643,974 | 6/1953 | Impagliazzo | 202—163 |
| 2,919,540 | 1/1960 | Percival | 60—39.18X |
| 2,924,074 | 2/1960 | Chambadal et al. | 60—73 |
| 3,237,413 | 3/1966 | Taubert | 60—64 |
| 3,365,888 | 1/1968 | Andersen et al. | 60—67 |

FOREIGN PATENTS

| | | |
|---|---|---|
| 225,538 | 8/1925 | Great Britain. |
| 329,318 | 11/1920 | Germany. |
| 338,449 | 6/1921 | Germany. |
| 421,461 | 11/1925 | Germany. |
| 516,562 | 1/1953 | Belgium. |
| 716,433 | 10/1954 | Great Britain. |
| 867,891 | 5/1961 | Great Britain. |
| 967,239 | 10/1957 | Germany. |

MARTIN P. SCHWADRON, *Primary Examiner.*
ROBERT R. BUNEVICH, *Assistant Examiner.*